United States Patent [19]
Takagi et al.

[11] Patent Number: 5,249,015
[45] Date of Patent: Sep. 28, 1993

[54] EXPOSURE CALCULATION DEVICE

[75] Inventors: Tadao Takagi, Yokohama; Hiroyuki Iwasaki, Kawasaki, both of Japan

[73] Assignee: Nikon Corporation, Tokyo, Japan

[21] Appl. No.: 935,437

[22] Filed: Aug. 26, 1992

[30] Foreign Application Priority Data

Sep. 3, 1991 [JP] Japan .................. 3-250557

[51] Int. Cl.$^5$ ............................ G03B 7/08; G01J 1/44
[52] U.S. Cl. ........................................ 354/432; 356/222
[58] Field of Search .................. 354/429, 431, 432; 250/214 P; 356/222

[56] References Cited

U.S. PATENT DOCUMENTS

| | | | |
|---|---|---|---|
| 4,445,778 | 5/1984 | Nakauchi | 354/432 X |
| 5,036,400 | 7/1991 | Haruki | 354/432 X |
| 5,164,759 | 11/1992 | Yasukawa | 354/432 X |
| 5,184,172 | 2/1993 | Miyazaki | 354/432 |

*Primary Examiner*—W. B. Perkey
*Attorney, Agent, or Firm*—Shapiro and Shapiro

[57] ABSTRACT

An exposure calculation device comprises: first composite photometered value calculation apparatus means for classifying areas of divisional photometering means to a first pattern and calculating a composite photometered value for each classified area based on the photometered values of the divisional photometering areas contained in each classified area; first exposure value calculation means for calculating a first exposure value based on the calculated composite photometered value; second composite photometered value calculation means for classifying the areas of the divisional photometering means to a second pattern and calculating a composite photometered value for each classified area based on the photometered values of the divisional photometering areas contained in each classified area; second exposure calculation means for calculating a second exposure value based on the calculated composite photometered value; contribution factor calculation means for calculating contribution factors of the first and second exposure values in accordance with a photographing condition; and third exposure value calculation means for combining the first exposure value and the second exposure value in accordance with the contribution factors calculated by the contribution factors calculation means to calculate an exposure value to control the exposure.

18 Claims, 13 Drawing Sheets

FIG.19

| NAME OF PHOTOGRAPHING SOFTWARE | GOODNESS OF FIT kSOFT |
|---|---|
| PORTRAIT | 0.8 |
| SCENERY | 0.2 |
| CLOSE-UP | 0.4 |
| SPORT | 0.6 |

EXPOSURE CALCULATION DEVICE

BACKGROUND OF THE INVENTION

1. Field of the Invention

The present invention relates to an exposure calculation device of a camera having a photometering device for photometering by dividing an object field of an object to be photographed into a plurality of areas.

2. Related Background Art

In a known exposure calculation device of a camera, a spot photo-sensing device for photometering a center area of an object field and a mean photosensing device for photometering the entire object field are provided, photometered outputs of both photo-sensing devices are compared, and if a reverse lighting status in which a background is light while a center object is dark is detected, a flash light is emitted as an auxiliary light even in a daylight photographing to attain proper exposure.

In another known exposure calculation device of a camera, an object field is finely divided (into 33 areas) for photometering, and the photometered output at a center area and a maximum output of the peripheral areas are compared, and if a reverse lighting status in which the periphery is lighter than the center is detected, a peripheral area having a lower photometered output than that of the center is sampled and an exposure value is determined based on the photometered outputs of the sampled peripheral and the center.

However, in the former exposure calculation device of the camera, proper exposure may be attained if the exposure of the entire field is important like scenery photographing, but if the exposure of a person who stands at a portion of the field like person photographing is important, the exposure is likely to be affected by the background and hence the flash photographing is used in the reverse lighting status for the person photographing.

In the latter exposure calculation device of the camera, when the exposure of the person who stands at a portion of the field is important, proper exposure may be attained because the finely divided area of the person are photometered, but when the exposure of the entire field is important like the scenery photographing, the exposure is likely to be affected by a portion of the field because the finely divided areas are photometered.

It is an object of the present invention to provide an exposure calculation device which selectively divides an object field of an object to be photographed finely or coarsely for photometering depending on a photographing condition.

SUMMARY OF THE INVENTION

When an object field is to be photometered, a divisional photometering method in which the field is divided into a plurality of areas and each area is photometered is frequently used.

The divisional photometering method includes a fine divisional photometering method and a coarse divisional photometering method.

Those methods include advantages and disadvantages, respectively.

In the coarse divisional photometering method, a good effect is attained where an overall exposure value is important like the scenery photographing, but where an exposure value of a specific point is important like the person photographing, proper exposure is hard to attain because of large affect by the background.

In the fine divisional photometering method, an excellent effect may be attained in the person photographing, but in the scenery photographing, proper exposure is hard to attain because it is likely to be affected by the exposure value of a specific area.

In the present invention, both the multi-area photometering means and the minor-area photometering means are provided, and when the exposure value is to be calculated based on the photometered outputs, contribution factors to the exposure value are varied in accordance with an object field status so that a proper exposure value is attained for various object fields.

In the present invention, the advantages in the fine divisional photometering method and the advantages in the coarse divisional photometering can be effectively utilized depending on the photographing condition.

The above object of the present invention is achieved by the exposure calculation device of the present invention which comprises:

first exposure value calculation means for dividing an object area into a first number of areas and calculating exposure values of the divisional areas;

second exposure value calculation means for dividing the object area into a second number of areas smaller than the first number and calculating exposure values of the divisional areas;

contribution factor calculation means for calculating a contribution factor in accordance with a photographing condition;

third exposure value calculation means for combining an output of said first exposure value calculation means and an output of said second exposure value calculation means in accordance with the contribution factor calculated by said contribution factor calculation means to calculate an exposure value; and exposure control means for controlling the exposure by using an output of said third exposure value calculation means.

BRIEF DESCRIPTION OF THE DRAWINGS

FIG. 19 shows a relation between photographing software and a fitness factor k soft.

DETAILED DESCRIPTION OF THE PREFERRED EMBODIMENTS

Figure 1:
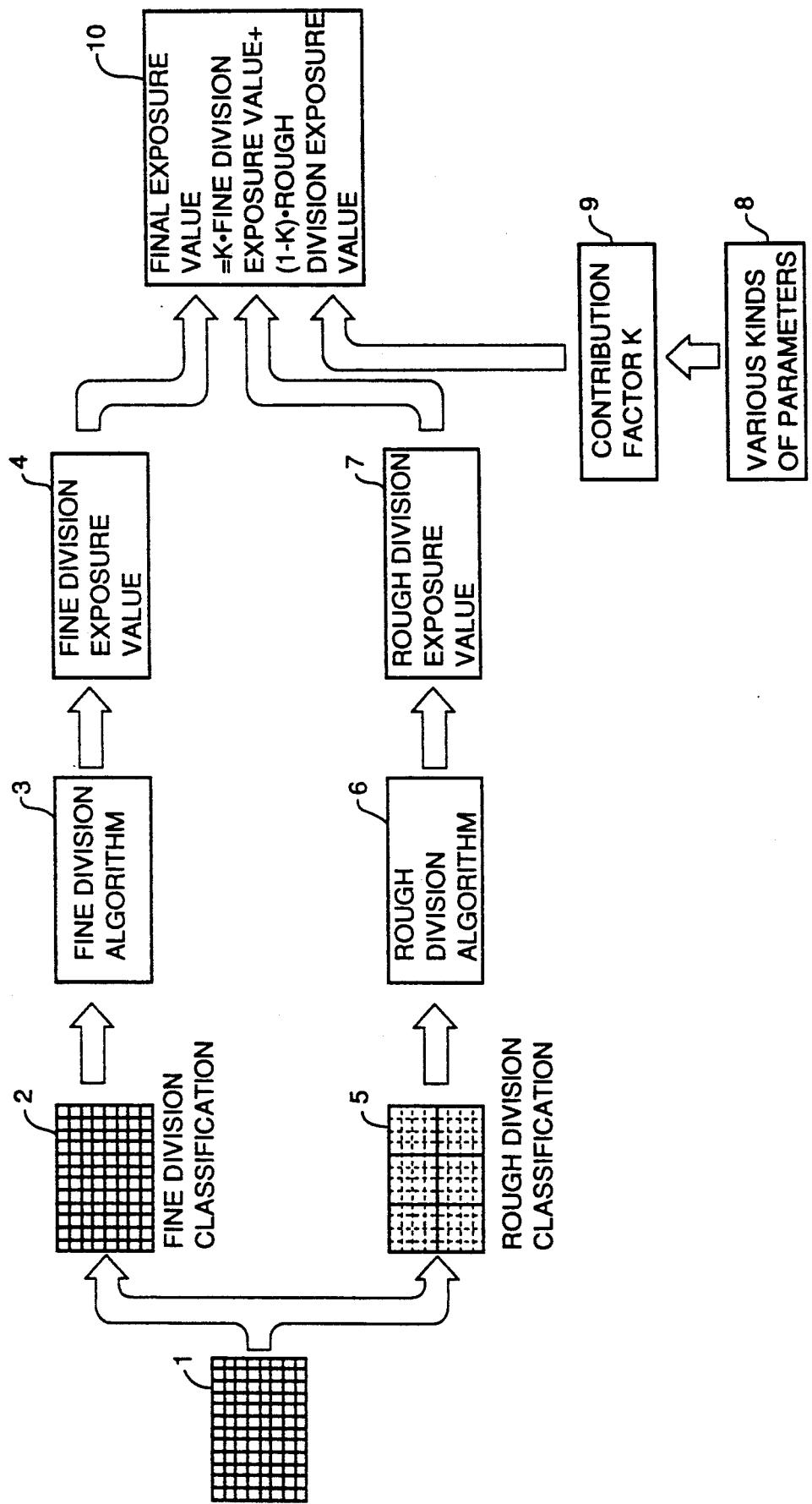
FIG. 1 shows an essence of the present invention.

FIG. 1 shows an essence of the present invention. The present invention is explained with reference to FIG. 1.

A photometering device 1 photometers an object field of an object to be photographed, which is divided into 150 areas (15 horizontals × 10 verticals). In fine division classification 2, the 150 divisional photometering areas are classified into 150 areas as they are, and a fine division exposure value 4 is calculated by a fine division algorithm 3 based on the 150 brightness values. On the other hand, in coarse division classification 5, the 150 divisional areas are classified into 6 sections each comprising 25 areas (5 horizontals × 5 verticals), and a coarse division exposure value 7 is calculated by a coarse division algorithm 6 based on the six consolidated brightness values. A contribution factor k 9 is calculated based on various parameters 8 such as a photographing distance and a defocusing distance. The fine division exposure value 4 and the coarse division exposure value 7 are weighted by the contribution factor k 9 and they are added to produce a final exposure value 10.

Figure 2:
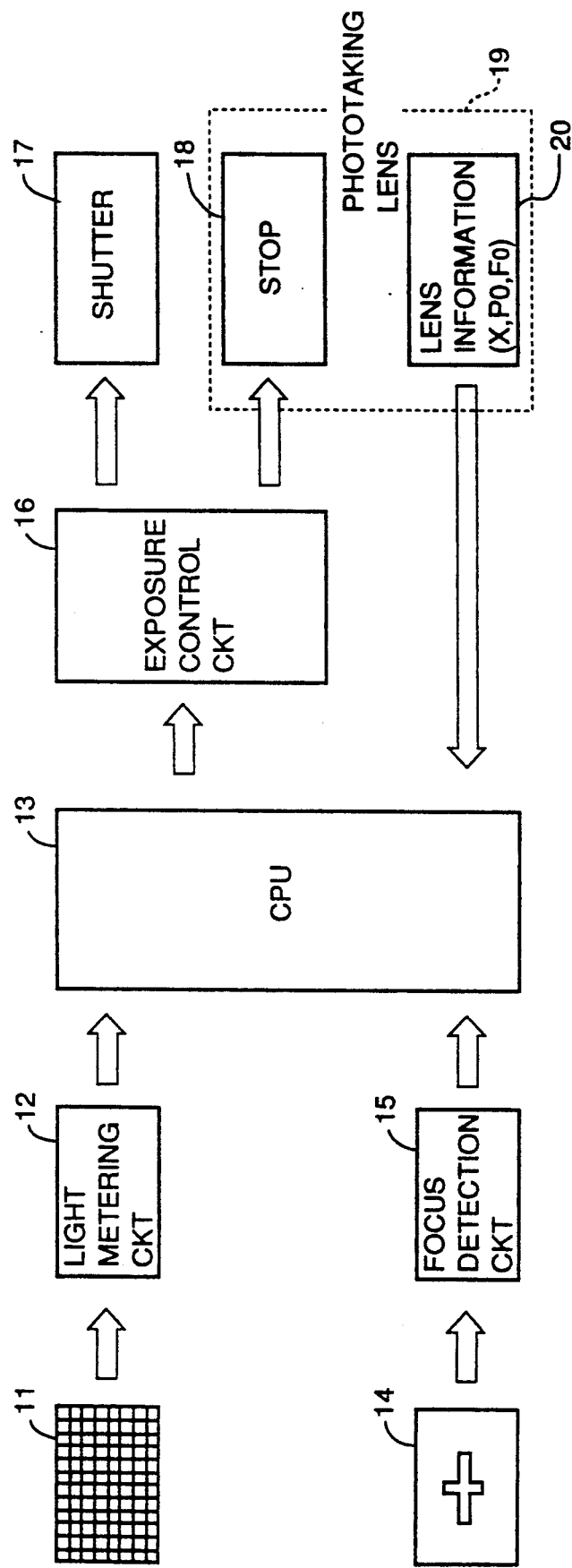
FIG. 2 shows a block diagram of one embodiment.

FIG. 2 shows a block diagram of one embodiment.

Numeral 11 denotes a divisional photometering device which photometers the 150 divided areas (15 horizontals × 10 verticals) of the object field. The divisional areas are addressed by (1, 1) (left bottom) - (m, n) - (15, 10) (right top). Numeral 12 denotes a photometering circuit which logarithmically compresses the output of the divisional photometering device 11 to convert it to a brightness BV (m, n). Numeral 13 denotes a microcomputer (CPU) which performs various sequence controls and arithmetic operations for the camera as well as exposure calculation by executing a control program to be explained later. Numeral 14 denotes a known image sensor which produces an electrical signal representing a light intensity distribution on photo-sensing devices arranged in cross shape at the center of the object field. Numeral 15 denotes a focus detection circuit which detects a defocusing distance and a direction thereof of a photographing lens in accordance with the electrical signal from the image sensor 14. Numeral 16 denotes an exposure control circuit which controls a shutter 17 and a stop 18. Numeral 19 denotes a photographing lens which is removably mounted on a camera body. Lens information 20 such as a photographing distance X, an exit pupil distance PO, an open F number OF and a focal distance f is transmitted to the CPU 13.

Figure 3:
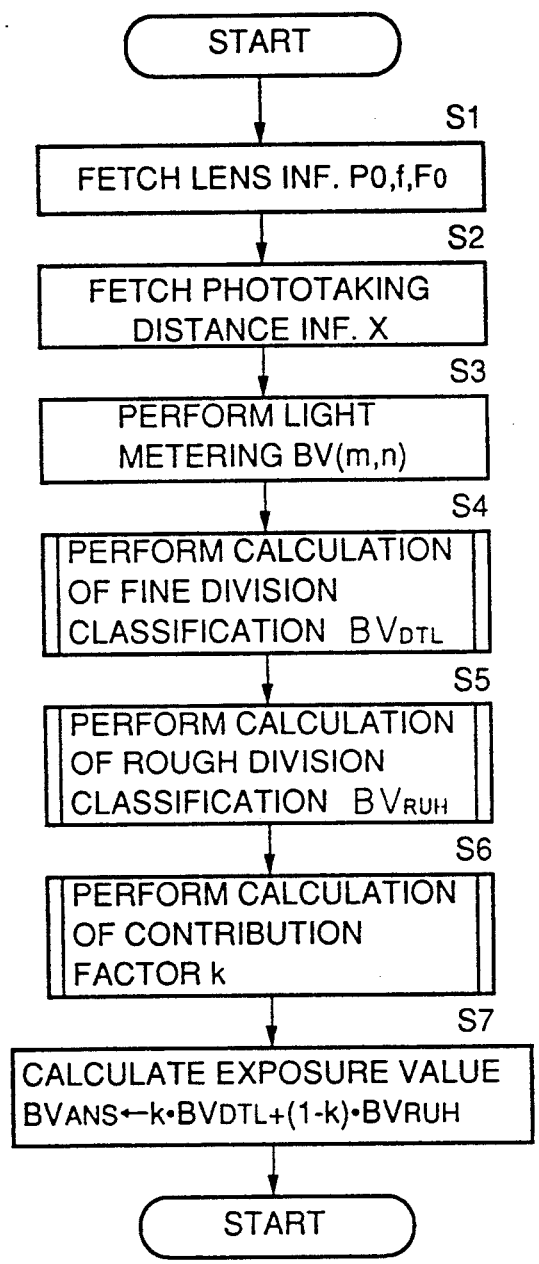
FIG. 3 shows a flow chart of a main control program.

FIG. 3 shows a flow chart of a main control program to be executed by the CPU 13. An operation of the embodiment is explained with reference to the flow chart.

Figure 4:
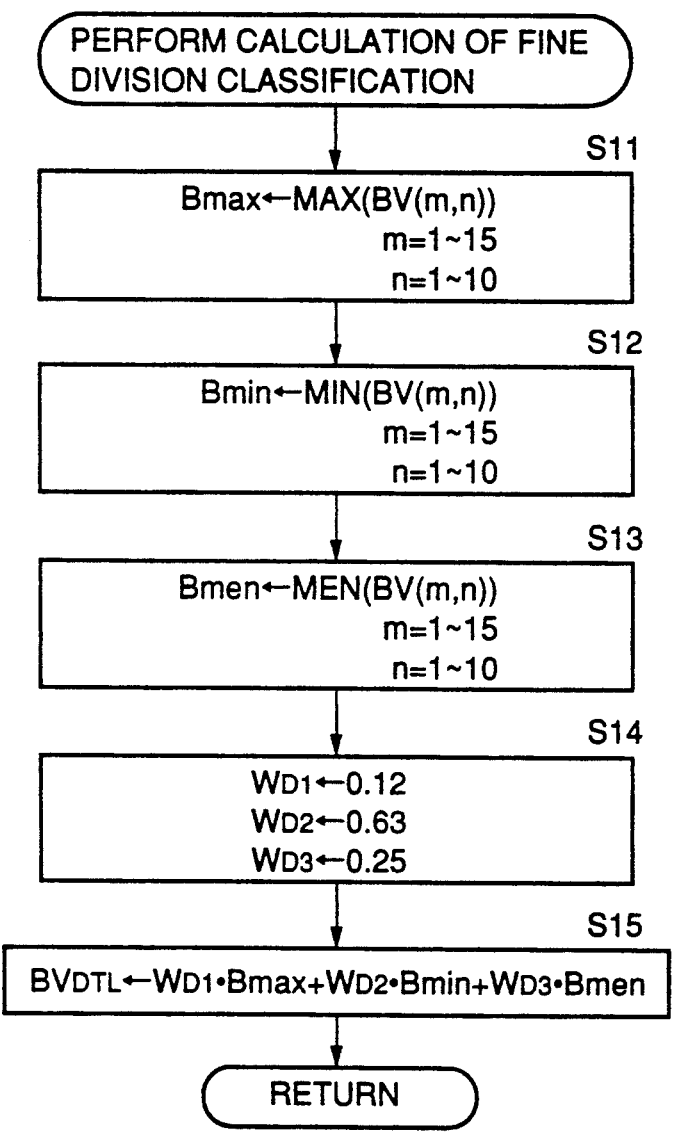
FIG. 4 shows a flow chart of a fine division calculation sub-routine.
Figure 5:
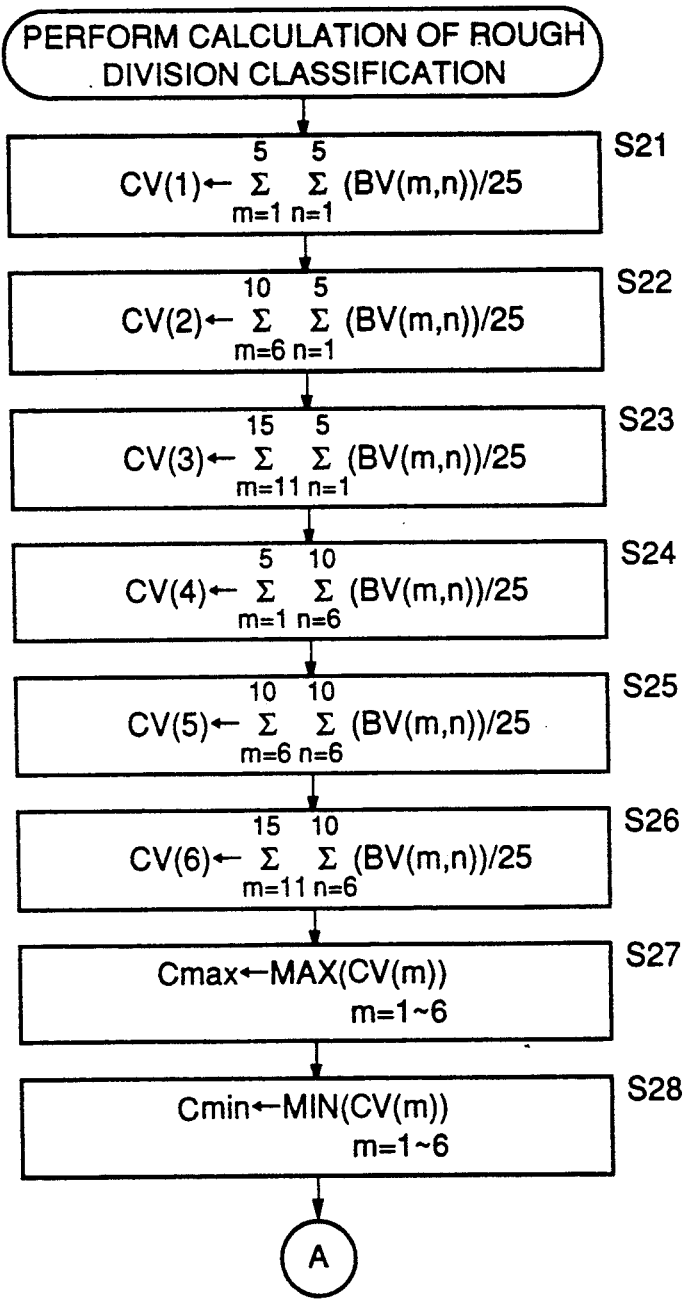
FIG. 5 shows a flow chart of a coarse division calculation sub-routine.
Figure 6:
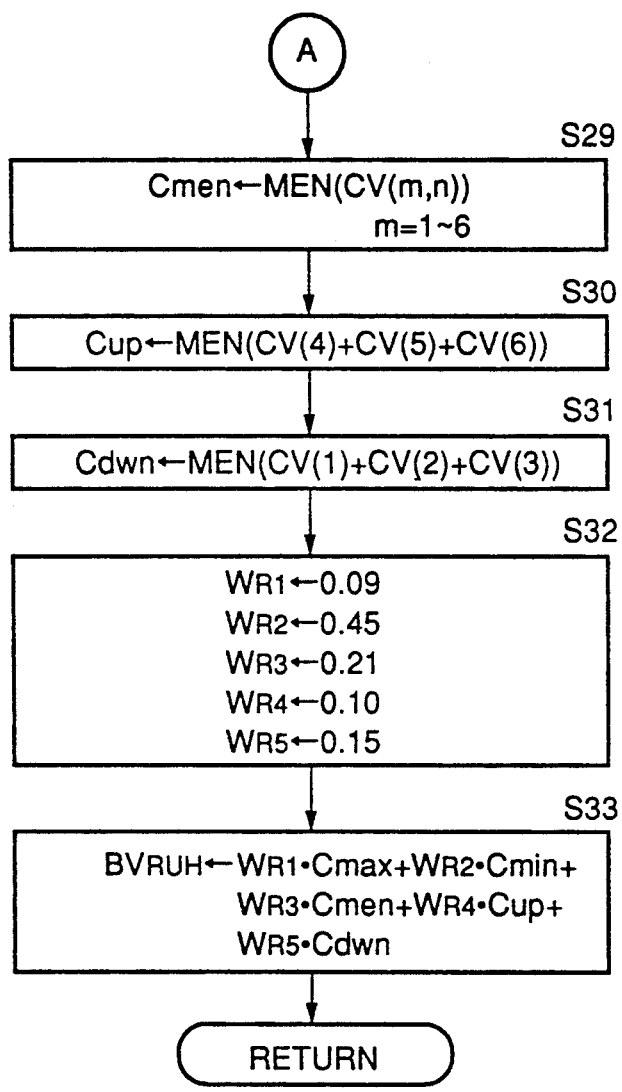
FIG. 6 shows a flow chart of a coarse division calculation sub-routine.
Figure 7:
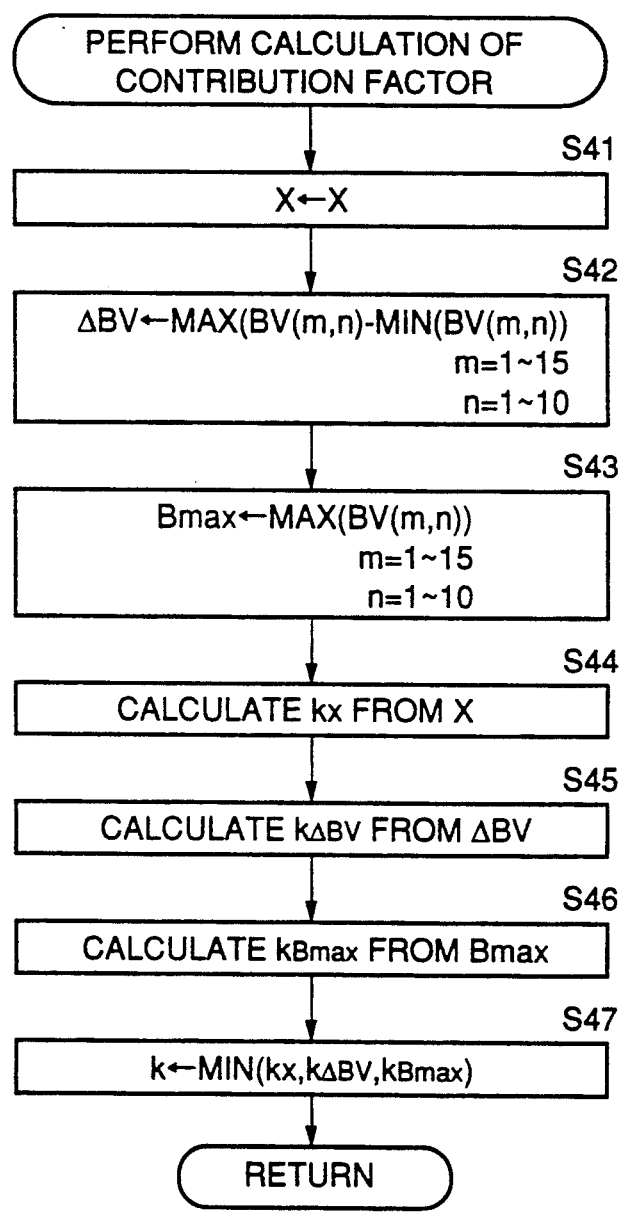
FIG. 7 shows a flow chart of a contribution factor calculation sub-routine.

In a step S1, the lens information 20 such as the exit pupil distance PO, the open F number FO and the focal distance f is read in. In a step S2, the photographing distance X is read in. In a step S3, the object is photometered by the divisional photometering device 11 and the photometering circuit 12 to calculate the brightness values BV (m, n) (m = 1-15, n = 1-10). In step S4, the fine division photometering calculation sub-routine shown in FIG. 4 is executed to calculate the fine division exposure value $BV_{FIN}$ based on the brightness values of the 150 divisional photometering areas. In a step S5, the coarse division photometering calculation sub-routine shown in FIGS. 5 and 6 are executed to calculate the coarse division exposure value $BV_{COA}$. In a step S6, the contribution factor calculation sub-routine shown in FIG. 7 is executed to calculate the contribution factor k. In a step S7, the final exposure value $BV_{ANS}$ is calculated by the following formula.

$$BV_{ANS} = k \cdot BV_{DTL} + (1-k) \cdot BV_{RUH} \qquad (1)$$

The shutter 17 and the stop 18 are controlled by the final exposure value $BV_{ANS}$.

In fine division classification calculation is now explained with reference to the flow chart of FIG. 4.

In a step S11, a maximum value Bmax of the 150 brightness values photometered by the divisional photometering device 11 is detected. In a step S12, a minimum value Bmin of the 150 brightness values is detected. In a step S13, a mean value Bmea of the 150 brightness values is calculated. In a step S14, weighting factors $W_{D1}$, $W_{D2}$ and $W_{D3}$ are set as follows.

$W_{D1} = 0.12$ $W_{D2} = 0.63$ $W_{D3} = 0.25$

In a step S15, the fine division exposure value $BV_{FIN}$ is calculated based on the maximum brightness value Bmax, the minimum brightness value Bmin, the mean brightness value Bmea and the weighting factors $W_{D1}$, $W_{D2}$ and $W_{D3}$ by the following formula.

$$BV_{FIN} = W_{D1} \cdot Bmax + W_{D2} \cdot Bmin + W_{D3} \cdot Bmea \qquad (2)$$

The coarse division classification calculation is now explained with reference to the flow charts of FIGS. 5 and 6.

In a step S21, a composite brightness value CV(1) is calculated by the following formula based on the brightness values of the 25 divisional photometering areas in one of the six sections (m = 1 − 5, n = 1-5).

$$CV(1) = \Sigma\Sigma(BV(m,n))/25 \qquad (3)$$

where ΣΣ represents summation for m = 1−5 and n = 1-5.

In a step S22, a composite brightness value CV(2) of the next section (m = 6-10, n = 1-5) is calculated by the following formula.

$$CV(2) = \Sigma\Sigma(BV(m,n))/25 \qquad (4)$$

where ΣΣ represents summation for m = 6-10 and n = 1-5.

Similarly, in a step S23, a composite brightness value CV(3) for the section (m = 11-15, n = 1-5) is calculated by the following formula.

$$CV(3) = \Sigma\Sigma(i \; BV(m,n))$$

where ΣΣ represents summation for m=11-15 and n =1-5.

In a step S24, a composite brightness value CV(4) of the section (m=1-5, n =6-10) is calculated by the following formula.

where ΣΣ represents summation for m=1-5 and n=6-10.

In a step S25, a composite brightness value CV(5) of the section (m=6-10, n=6-10) is calculated by the following formula.

$$CV(5)=\Sigma\Sigma(BV(m,n))/ \qquad (7)$$

where ΣΣ represents summation for m=6-10 and n=6-10.

In a step S26, a composite brightness value CV(6) of the section (m=11-15, n=6-10) is calculated by the following formula.

$$CV(6)=\Sigma\Sigma(BV(m,n))/ \qquad (8)$$

where ΣΣ represents summation for m=11-15 and n=6-10.

In a step S27, a maximum value Cmax of the six calculated composite brightness values CV(1)-CV(6) of the sections is detected. In a step S28, a minimum value Cmin of the six composite brightness value CV(1)-CV(6) is detected. In a step S29 of FIG. 6, a mean value Cmea of the six composite brightness values CV(1)-CV(6) is calculated. In a step S30, a mean value Cup of the composite brightness values CV(4)-CV(6) of the three upper sections of the field is calculated. In a step S31, a mean value Cdwn of the composite brightness values CV(1)-CV(3) of the three lower sections of the field is calculated. In a step S32, weighting factors $W_{R1}$, $W_{R2}$, $W_{R3}$, $W_{R4}$ and $W_{R5}$ are set as follows.

$W_{R1}=0.09$ $W_{R2}=0.45$ $W_{R3}=0.21$ $W_{R4}=0.10$ $W_{R5}=0.15$

In a step S33, a coarse division exposure value Bcoa is calculated by the following formula based on the brightness values calculated in the above steps and the weighting factors.

$$BVcoa = W_{R1}\cdot Cmax + W_{R2}\cdot Cmin + W_{R3}\cdot Cmea + W_{R4}\cdot Cup + W + W_{R5}\cdot Cdwn \qquad (9)$$

The contribution factor calculation is now explained with reference to the flow chart of FIG. 7.

Figure 8:
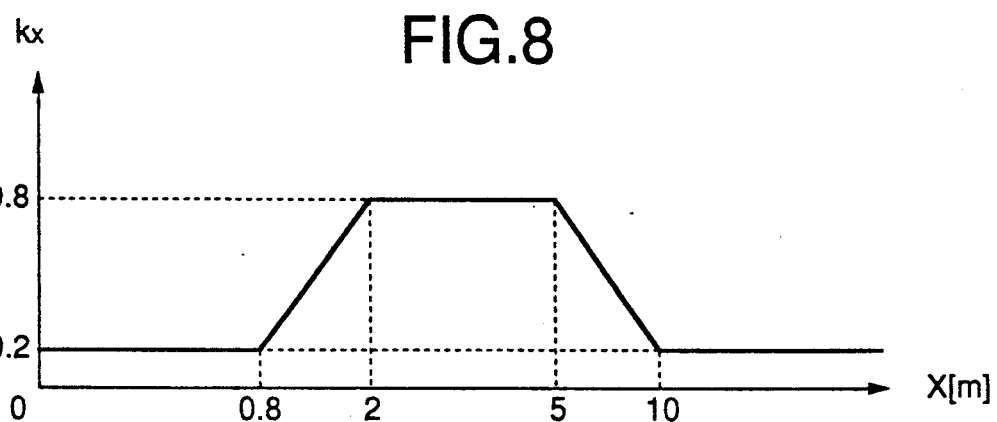
FIG. 8 shows a relation between a photographing distance X and a fitness factor kX.
Figure 9:
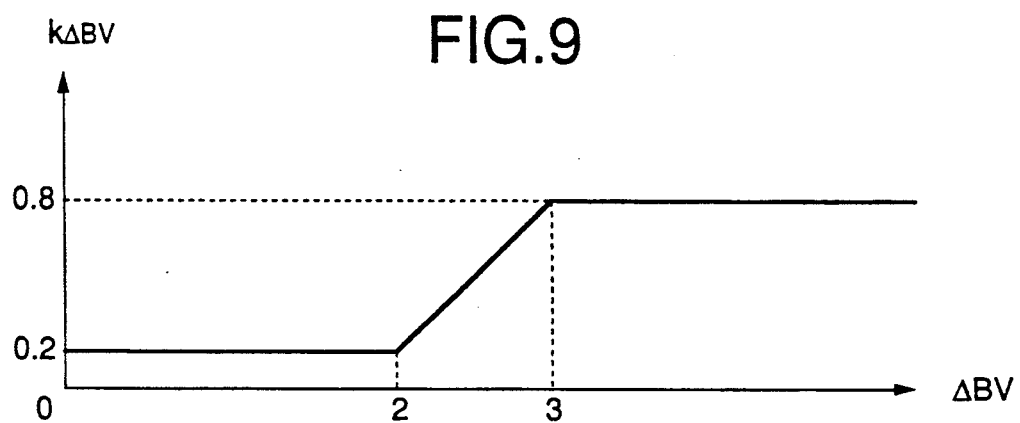
FIG. 9 shows a relation between a brightness difference $\Delta BV$ and a fitness factor $k\Delta BV$.
Figure 10:
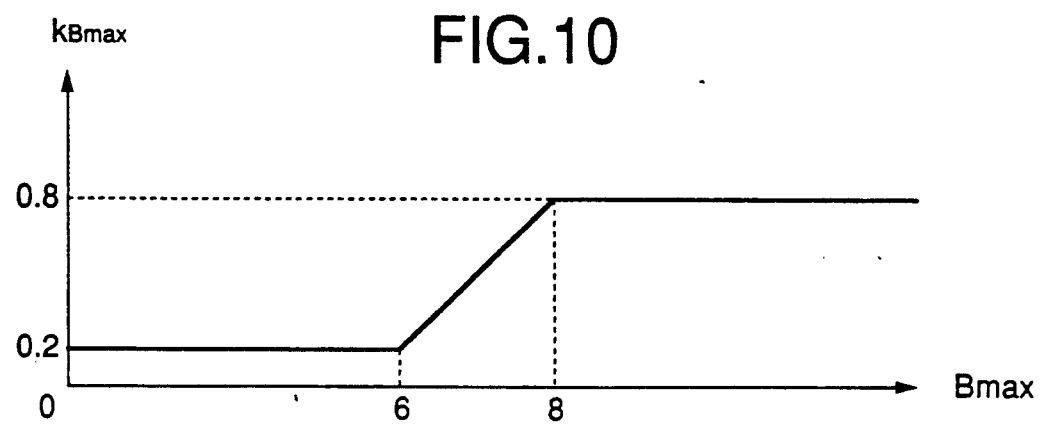
FIG. 10 shows a relation between a maximum brightness Bmax and a fitness factor kBmax.

In a step S41, the photographing distance X is read in. In a step S42, a brightness difference ΔBV between the maximum and the minimum of the 150 brightness values detected by the divisional photometering device 11. In a step S43, a maximum brightness value Bmax of the 150 brightness values is detected. In a step S44, a fitness factor kX is determined from FIG. 8 based on the photographing distance X. In a step K45, a fitness factor kΔBV is determined from FIG. 9 based on the brightness difference ΔBV. In a step S46, a fitness factor kBmax is determined from FIG. 10 based on the maximum brightness value Bmax. In a step S47, a minimum of the fitness factors kX, kΔBV and kBmax is selected as the contribution factor k.

In this manner, the divisional photometering areas of the finely divided divisional photometering device is classified into the finely classified patterns and the coarsely classified patterns, and the composite brightness values of the respective sections of the respective patterns are calculated and the exposure values of the patterns are calculated based on the composite brightness values. The contribution factors of the exposure values of the patterns are determined based on the photographing condition such as the photographing distance, the brightness difference and the maximum brightness, and the exposure values of the patterns are combined in accordance with the contribution factors to calculate the final exposure value. Accordingly, the advantage obtained when the object field is finely divided for photometering and the advantage obtained when the object field is coarsely divided for photometering can be effectively utilized in accordance with the photographing condition so that a probability of proper exposure for various photographing scenes is enhanced.

Since a fuzzy inference theory is used to determine the contribution factor k, the variation of exposure in a repeated photographing mode, that is, great variation of the exposure value for a small change in composition is avoided.

While the 150-division photometering device 11 is shown in the embodiment, the number of divisions of the photometering device and the division pattern are not limited to those of the embodiment. In the present embodiment, the finely divided photometering device 11 is classified into the fine classification patterns and the coarse classification patterns although two divisional photometering devices, that is, the divisional photometering device with fine divisional patterns and the divisional photometering device with coarse divisional patterns may be used. In this case, one is finely divided and the other is coarsely divided and the number of divisions and the division patterns may be any desired ones. In this case, it is not necessary to calculate the composite brightness values of the respective patterns, as it is in the above embodiment.

Figure 11:
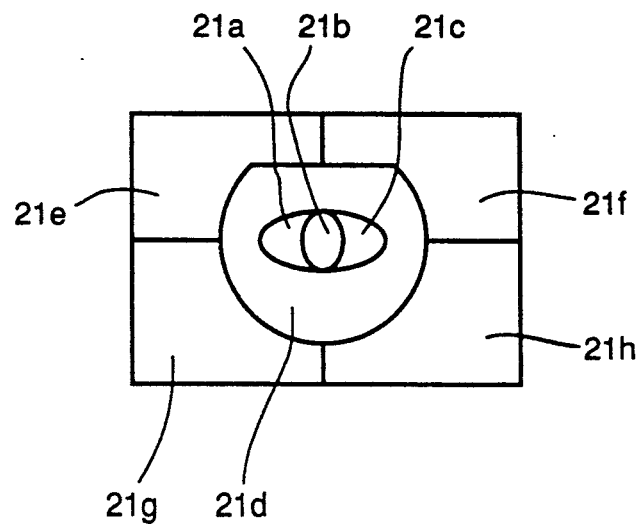
FIG. 11 shows another example of division of a photometered area.
Figure 12:
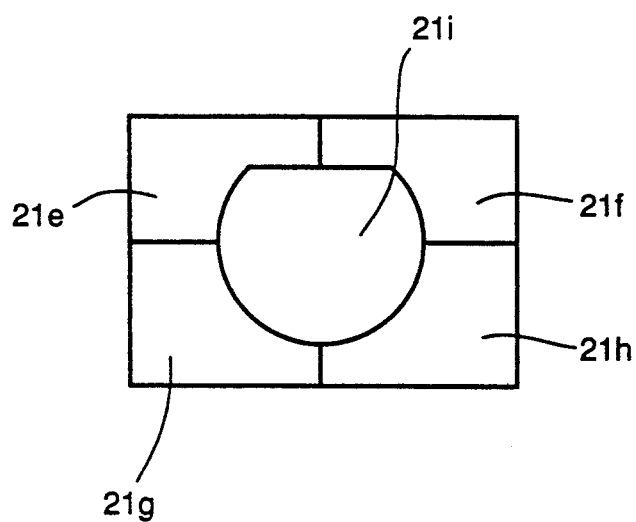
FIG. 12 shows other example of division of the photometered area.

FIGS. 11 and 12 shows other examples of division of the photometering area. FIG. 11 shows a finely divided classification pattern divided into eight areas 21a-21h, and FIG. 12 shows a coarsely divided classification pattern divided into five areas 21e-21h and 21i. The area 21i shown in FIG. 12 is a combined area of the areas 21a-21d shown in FIG. 11.

Figure 13A:
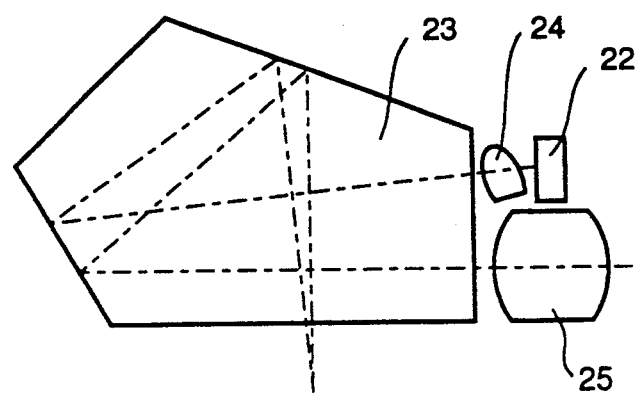
FIGS. 13A and 13B show arrangements of divisional photometering devices 21 shown in FIGS. 11 and 12, FIGS. 14A and 14B show other arrangements of the divisional photometering devices 21 shown in FIGS. 11 and 12.
Figure 13B:
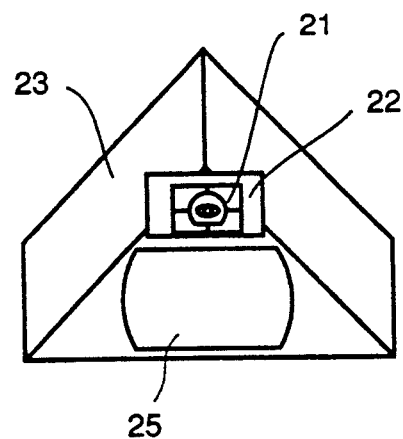

FIGS. 13A and 13B show arrangements of the divisional photometering devices 21 shown in FIGS. 11 and 12. FIG. 13A shows a sectional view and FIG. 13B shows a side view. Numeral 22 denotes a divisional photometering package including the divisional photometering device 21 and peripheral circuits thereof, numeral 23 denotes a penta prism, numeral 24 denotes a condenser lens, and numeral 25 denotes an eye lens.

Figure 14A:
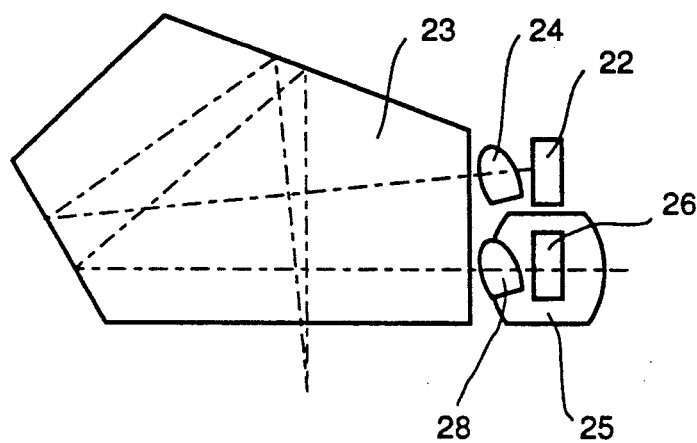
Figure 14B:
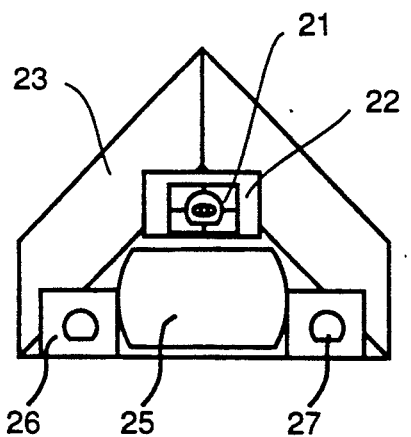

FIGS. 14A and 14B show other arrangements of the divisional photometering devices 21 shown in FIGS. 11 and 12. FIG. 14A shows a sectional view and FIG. 14B shows a side view. Numerals 26 and 27 denote photometering devices and numeral 28 denotes a condenser lens. A condenser lens for the photometering device 27 is not shown. By the addition of the photometering devices 26 and 27, the photometering by a prior art photographing lens is enabled. By outputting the photometered output at the center area as a composite photometered value of the photometering device 26 and the photometering device 27, the correction for the open condition can be readily done even if the exit pupil distance PO is not provided as the lens information as is the case of the prior art photographing lens. When the prior art photographing lens is mounted, the center area is photometered by using the photometering devices 26 and 27, and when a new photographing lens is mounted, the divisional photometering package 22 is used for divisional photometering.

Figure 15:
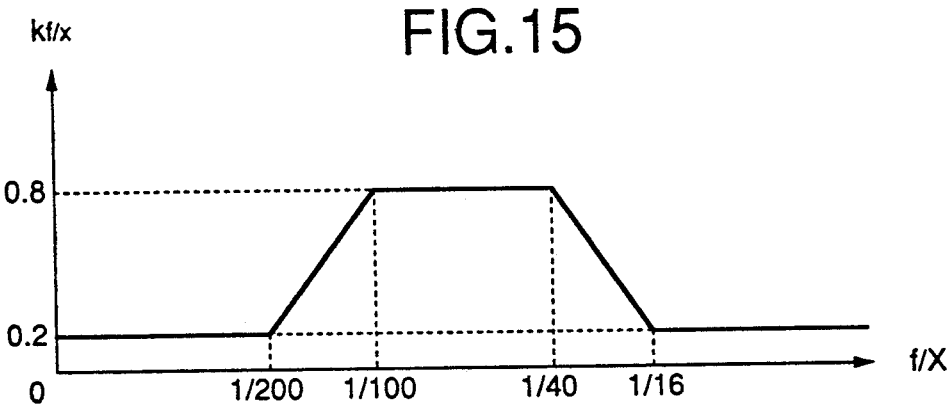
FIG. 15 shows a relation between a photographing magnification factor f/X and a fitness factor kf/X.
Figure 16:
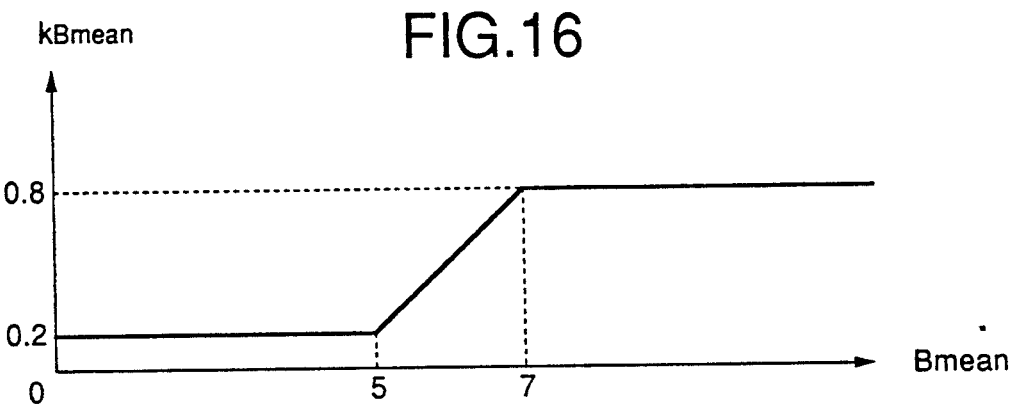
FIG. 16 shows a relation between a mean brightness Bmean and a fitness factor kBmean.

In the above embodiments, the fitness factors kX, kΔBV and kBmax are determined based on the photographing distance X, the brightness difference ΔBV and the maximum brightness Bmax to calculate the contribution factor k. Alternatively, the fitness factor k f/X may be determined from FIG. 15 based on the photographing magnification factor f/X instead of the photographing distance X, the fitness factor kBmean may be determined from FIG. 16 based on the mean brightness value Bmean instead of the maximum brightness Bmax, and the contribution factor k may be calculated based on the fitness factors kf/X, k BV and kBmean.

Figure 17:
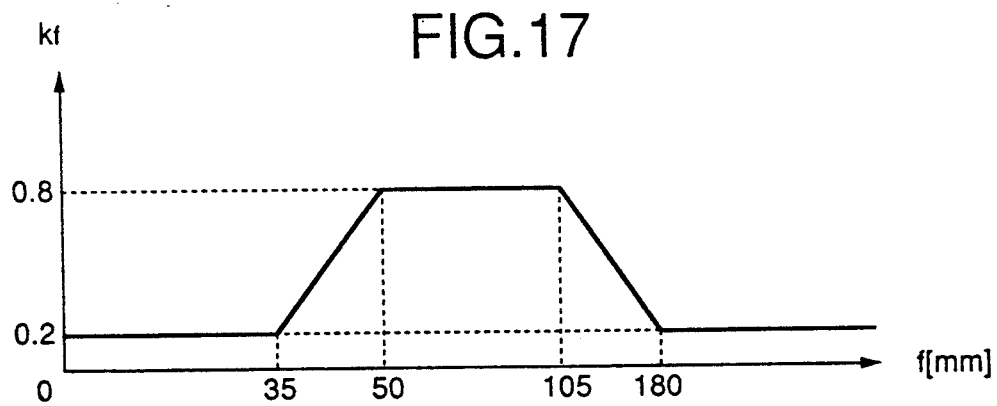
FIG. 17 shows a relation between a focal distance f and a fitness factor kf.
Figure 18:
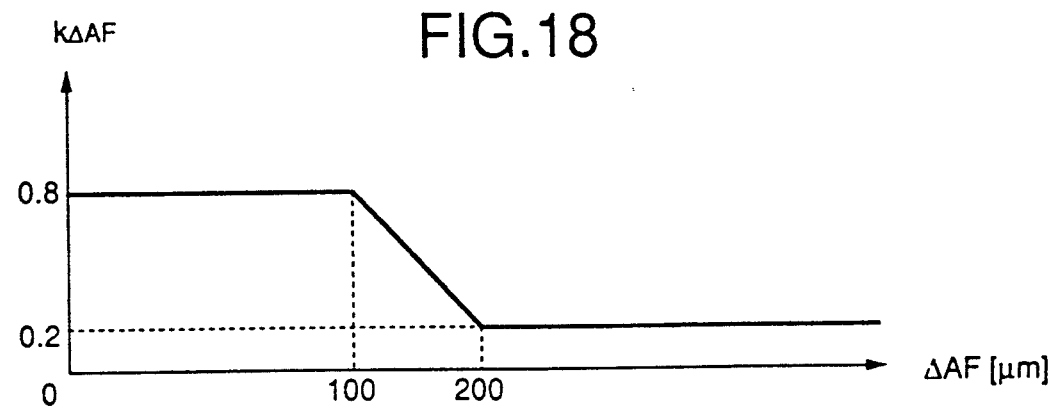
FIG. 18 shows a relation between a defocusing distance ΔAF and a fitness factor kΔAF.

Further alternatively, the fitness factor kf may be determined from FIG. 17 based on the focal distance f instead of the photographing distance X, the fitness factor kΔAF may be determined from FIG. 18 based on the defocusing distance ΔAF instead of the brightness difference ΔBV, the fitness factor k soft may be determined from FIG. 19 based on the photographing software instead of the maximum brightness valve Bmax, and the contribution factor k may be calculated based on the fitness factors kf, kΔAF and k soft. In the software to be photographed, when a photographer selects a type of photographing scene such as portrait, scenery, close-up and sport, the camera automatically sets a corresponding program diagram and exposure correction.

In the steps S21-S26 of FIG. 5, the mean value of the 25 brightness values is set to the composite brightness value of the 25 divisional photometering areas. Alternatively, the 25 brightness values may be converted to real numbers, averaged and the mean value may be logarithmically compressed to produce a composite brightness value.

In the above embodiment, the divisional photometering device 11 and the photometering circuit 12 constitute the divisional photometering means, the microcomputer (CPU) 11 constitutes the first composite photometered value calculation means, the second composite photometered value calculation means, the first exposure value calculation means, the second exposure value calculation means, the third exposure value calculation means and the contribution factor calculation means, and the exposure control circuit 16 constitutes the exposure control means.

What is claimed is:

1. An exposure calculation device comprising:
    divisional photometering means for photometering a plurality of divided areas of an object field to produce photometered outputs of the respective divisional photometering areas;
    first composite photometered value calculation means for classifying the areas of said divisional photometering means to a first pattern and calculating a composite photometered value for each classified area based on the photometered values of the divisional photometering areas contained in each classified area;
    first exposure value calculation means for calculating a first exposure value based on the composite photometered value calculated by said first composite photometered value calculation means;
    second composite photometered value calculation means for classifying the areas of said divisional photometering means to a second pattern and calculating a composite photometered value for each classified area based on the photometered values of the divisional photometering areas contained in each classified area;
    second exposure calculation means for calculating a second exposure value based on the composite photometered value calculated by said second composite photometered value calculation means;
    contribution factor calculation means for calculating contribution factors of the first and second exposure values in accordance with a photographing condition; and
    third exposure value calculation means for combining the first exposure value and the second exposure value in accordance with the contribution factors calculated by said contribution factor calculation means to calculate an exposure value to control the exposure.

2. An exposure calculation device according to claim 1, wherein said contribution factor calculation means calculates a difference between a maximum photometered value and a minimum photometered value of the divisional photometering areas as said photographing condition, and calculates the contribution factor in accordance with said difference.

3. An exposure calculation device according to claim 1, wherein said contribution factor calculation means detects a maximum photometered value of the divisional photometering areas as said photographing condition, and calculates the contribution factor in accordance with the maximum photometered value.

4. An exposure calculation device according to claim 1 wherein said contribution factor calculation means calculates a mean photometered value of the divisional photometering areas as said photographing condition and calculates the contribution factor in accordance with the mean photometered value.

5. An exposure calculation device according to claim 1 wherein said contribution factor calculation means calculates the contribution factor in accordance with a photographing distance as said photographing condition.

6. An exposure calculation device according to claim 1 wherein said contribution factor calculation means calculates the contribution factor in accordance with a focal distance of a photographing lens as said photographing condition.

7. An exposure calculation device according to claim 1 wherein said contribution factor calculation means calculates the contribution factor in accordance with a defocusing distance of a photographing lens as said photographing condition.

8. An exposure calculation device according to claim 1 wherein said contribution factor calculation means calculates the contribution factor in accordance with a photographing software as said photographing condition.

9. An exposure calculation means comprising:

first divisional photometering means for photometering a first divisional pattern of an object field to produce a photometered value for each divisional photometering area;

first exposure value calculation means for calculating a first exposure value based on the photometered values of said first divisional photometering means;

second divisional photometering means for photometering a second divisional pattern of the object field to produce a photometered value for each divisional photometering area;

second exposure value calculation means for calculating a second exposure value based on the photometered values of said second divisional photometering means;

contribution factor calculation means for calculating contribution factors of the first and second exposure values in accordance with a photographing condition; and third exposure value calculation means for combining the first exposure value and the second exposure value in accordance with the contribution factors calculated by said contribution factor calculation means to calculate an exposure value to control the exposure.

10. An exposure calculation device according to claim 9 wherein said contribution factor calculation means calculates a difference between a maximum photometered value and a minimum photometered value of the divisional photometering areas as said photographing condition, and calculates the contribution factor in accordance with said difference.

11. An exposure calculation device according to claim 9 wherein said contribution factor calculation means detects a maximum photometered value of the divisional photometering areas as said photographing condition, and calculates the contribution factor in accordance with the maximum photometered value.

12. An exposure calculation device according to claim 9 wherein said contribution factor calculation means calculates a mean photometered value of the divisional photometering areas as said photographing condition and calculates the contribution factor in accordance with the mean photometered value.

13. An exposure calculation device according to claim 9 wherein said contribution factor calculation means calculates the contribution factor in accordance with a photographing distance as said photographing condition.

14. An exposure calculation device according to claim 9 wherein said contribution factor calculation means calculates the contribution factor in accordance with a focal distance of a photographing lens as said photographing condition.

15. An exposure calculation device according to claim 9 wherein said contribution factor calculation means calculates the contribution factor in accordance with a defocusing distance of a photographing lens as said photographing condition.

16. An exposure calculation device according to claim 9 wherein said contribution factor calculation means calculates the contribution factor in accordance with a photographing software as said photographing condition.

17. An exposure calculation device comprising:

first exposure value calculation means for dividing an object area into a first number of areas and calculating exposure values of the divisional areas;

second exposure value calculation means for dividing the object area into a second number of areas smaller than the first number and calculating exposure values of the divisional areas;

contribution factor calculation means for calculating a contribution factor in accordance with a photographing condition;

third exposure value calculation means for combining an output of said first exposure value calculation means and an output of said second exposure value calculation means in accordance with the contribution factor calculated by said contribution factor calculation means to calculate an exposure value; and exposure control means for controlling the exposure by using an output of said third exposure value calculation means.

18. An exposure calculation device comprising:

divisional photometering means for photometering a plurality of divided areas of an object field to produce photometered outputs of the respective divisional photometering areas;

first exposure value calculation means for calculating a first exposure value based on the photometered values said divisional photometering areas;

composite photometered value calculation means for classifying the areas of said divisional photometering means and calculating a composite photometered value for each classified area based on the photometered values of the divisional photometering areas contained in each classified area;

second exposure calculation means for calculating a second exposure value based on the composite photometered value calculated by said composite photometered value calculation means;

contribution factor calculation means for calculating contribution factors of the first and second exposure values in accordance with a photographing condition; and third exposure value calculation means for combining the first exposure value and the second exposure value in accordance with the contribution factors calculated by said contribution factor calculation means to calculate an exposure value to control the exposure.

* * * * *